United States Patent [19]

Longfellow

[11] 4,178,742
[45] Dec. 18, 1979

[54] PROTECTIVE ANIMAL GOGGLES

[76] Inventor: Forrest E. Longfellow, 982 Young Ave., Barberton, Ohio 44203

[21] Appl. No.: 848,893

[22] Filed: Nov. 7, 1977

[51] Int. Cl.² ............................................. B68C 5/00
[52] U.S. Cl. ............................................. 54/80; 2/436
[58] Field of Search ............... 54/80; 119/104; 2/435, 2/436

[56] References Cited

U.S. PATENT DOCUMENTS

| 611,396 | 9/1898 | Sheldon | 54/80 X |
|---|---|---|---|
| 2,407,029 | 9/1946 | Miller | 54/80 |
| 3,418,658 | 12/1968 | Danico | 2/436 |
| 3,924,388 | 12/1975 | Morrison | 54/80 |

FOREIGN PATENT DOCUMENTS 499960  3/1951  Belgium ........................................ 54/80

Primary Examiner—Louis G. Mancene
Assistant Examiner—Daniel J. Leach
Attorney, Agent, or Firm—Oldham, Oldham, Hudak & Weber Co.

[57] ABSTRACT

An eye protection device comprising a soft, flexible plastic envelope forming a goggle enclosure contoured to comfortably conform to the angular anterior cranial features of a particular mammalian, non-human animal, such as a dog, two elastic band means for extending in different directions for securing said envelope to the cranium; the envelope having venting means for permitting indirect exposure of the animal's eyes to the atmosphere; and a plastic window positioned at a front opening in the envelope.

4 Claims, 4 Drawing Figures

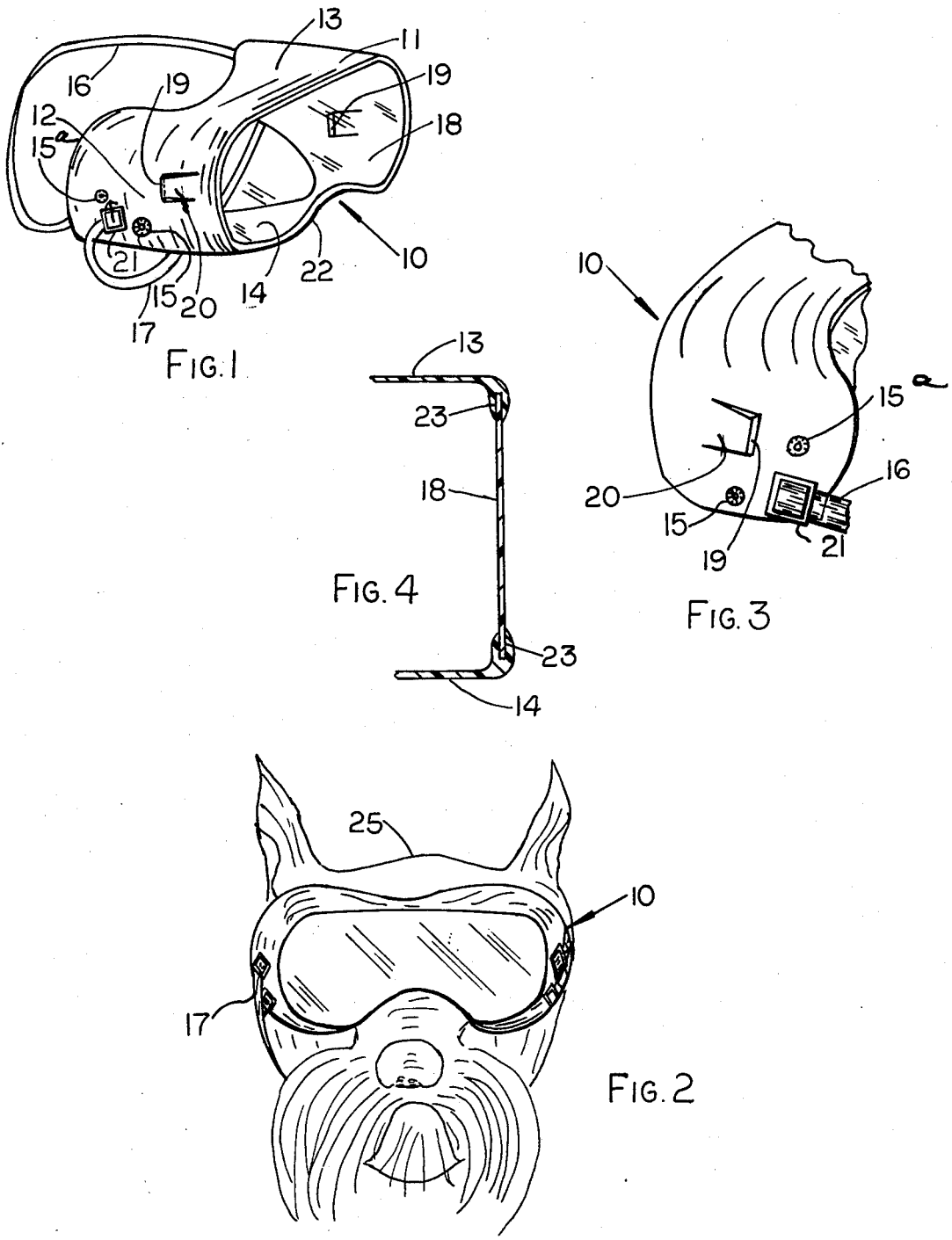

PROTECTIVE ANIMAL GOGGLES

BACKGROUND OF INVENTION

Heretofore numerous approaches have been taken to solve the problem of protection of the eyes for human beings and animals. More particularly, as animals have become more valued and prized, the scope of preventive veterinary care has grown to include protection of the animals' eyesight. Depending upon the function of the eye protection, and the type of animal protected, the design and utility of protective eyesight devices have greatly varied.

For example, U.S. Pat. No. 2,407,029 issued disclosing an eye shield design for use by equines. Another animal sight protecting device is disclosed in U.S. Pat. No. 3,924,388, an eye protection mask which snugly engages the animal's face to prevent any contact of the animal's eyes with the air would typically be utilized when intense lachrymators surround the animal in an enclosed area. However, no invention provides goggles which may be used to protect the animal from direct exposure to foreign objects and fumes but retain comfortable installation by allowing a vented area between the eyes and the viewing area.

Protective eyesight devices for animals differ from protective eyesight devices for human beings in that the mandible in humans does not extend beyond the anterior surface of the cranium. Conversely, in most mammalian vertebrated animals, the mandible and muzzle extend far beyond the anterior surface of the cranium. Therefore, it is far more difficult to adapt securing means that will maintain an eye protection device in position on the cranium of an animal. Another difference between the human head and an animal head is that the anterior surface of the cranium of a human is relatively vertical as compared to the angled anterior surface of the cranium for an animal. Because of this difference, any animal eye protection device must be contoured so as to account for this angled cranial shape.

OBJECTS OF THE INVENTION

Consequently, it is an object of the invention to present protective animal goggles wherein the material for forming said goggles is shaped so as to conform to the particular cranial features of the animal being protected.

It is another object of the invention to present protective animal goggles wherein the goggles may be firmly secured by adjustable elastic strapping bands which are positioned so as to prevent the animal from shaking the goggles from its head.

It is a further object of the invention to present protective animal goggles wherein the shape of the upper portion of the goggles extends beyond the lower portion of the goggles so as to adapt to the angular anterior cranial features of the animal being protected.

Yet a further object of the invention is to present protective animal goggles wherein said goggles have a vertical, shatterproof viewing area to permit continued visual preception by the animal while protecting it from direct exposure to foreign objects and fumes.

Yet another object of the invention is to present protective animal goggles wherein said goggles have air vents formed in the side portions of the goggles so as to promote indirect air circulation, prevent interior fogging, and equilibrate interior air pressure with the atmosphere.

These objects and other objects which will become apparent as the detailed description proceeds are achieved by an eye protection device adaptable to mammalian, non-human animals, comprising a soft, flexible plastic envelope forming a goggled enclosure about the eyes, protecting the animal from direct exposure to foreign objects and fumes; said envelope contoured to comfortably conform to the angular anterior cranial features of the particular mammalian, non-human animal; said envelope having two strapping band means for securing said envelope to the cranium; one said strapping band means extending around the posterior surface of the cranium and the other strapping band means extending around the mandible of the animal; said envelope having venting means for permitting indirect exposure of the animal's eyes to the atmosphere, and a shatterproof plastic window at the envelope.

DESCRIPTION OF THE DRAWINGS

For a complete understanding of the objects, techniques, and structure of the invention, reference should be had to the following detailed description and accompanying drawings wherein:

FIG. 1 is a perspective view of the protective animal goggles;

FIG. 2 is a front illustrative drawing of the protective animal goggles installed upon an animal;

FIG. 3 is a fragmentary side perspective of the goggles; and

FIG. 4 is a vertical section of the plastic window and securing means therefor.

DETAILED DESCRIPTION OF THE PREFERRED EMBODIMENT

Referring now to the drawings and more particularly to FIG. 1, an understanding of the structure of the protective animal goggles 10 may be achieved. The goggles 10 are composed of a soft, flexible plastic envelope 11, a shatterproof plastic window 18, and two adjustable elastic strapping bands 16 and 17. The soft flexible plastic envelope 11 has contoured side portions 12 and contoured upper portion 13 which extend back from the vertical window 18 to comfortably engage with the angular anterior cranial structure of the animal's head. The contoured lower portion 14 of the flexible plastic envelope 11 is considerably shorter in depth than the side portions 12 and the upper portion 13 to also accommodate for the angle of the animal's cranium. The contoured lower portion 14 of the envelope 11 also is curved upwardly at 22 to accommodate the goggles 10 to the animal's muzzle.

The air vents 19 are located on both sides of the flexible plastic envelope 11 to equilibrate the air pressure within the goggles 10 to that of the atmosphere, to promote circulation of air through the goggles 10 and to prevent fogging within the flexible plastic envelope 11. The air vents 19 are formed at the rear of the protruding ribs 20 projecting out from the sides of the envelope in a laterally recessed part of the envelope to permit air to only indirectly enter the goggles 10. Permitting the direct entry of air into the interior area of the goggles 10 would defeat the protection afforded by the goggles 10 themselves.

On each contoured side portion 12 of the flexible plastic envelope 11, two snaps 15 are positioned, which snaps engage their mating portions secured to the ends of the elastic bands 16 and 17. All four snaps 15 may be disengaged to permit installation on the animal, or the snaps 15 on one side may remain engaged while the other side is disengaged to permit installation. Adjustable buckles 21 are usually employed to slidably engage the bands to lengthen or shorten the adjustable elastic bands 16 and 17 permitting individual fitting, and part of the snap device is attached to such buckle plate 21. The forward or lower snaps 15 engage the adjustable cranium elastic band 16. This band 16 is a horizontal strap which secures the goggles 10 in place along the muzzle of the animal. The rearward, or upper snaps 15a engage the adjustable mandible elastic band 17 which secures the goggles 10 to the throat area of the animal. This latter securement prevents vertical movement of the goggles 10 on the animal, and the overlapping of the straps aids in retaining the goggles in position.

The shatterproof plastic window 18 is fitted into the forward opening of the flexible plastic envelope 11 in a suitable inwardly open groove provided outlining the opening. The window 18 is made of any suitable transparent shatterproof plastic which is somewhat flexible. The plane of the shatterproof plastic window 18 should be normal to the direction of vision of the animal's eyes for best vision for the animal.

Referring now to FIG. 2, the installation of the goggles 10 on the animal 25 may be seen. In this case, the goggles 10 are installed on a canine 25, although the goggles 10 are designed to protect the eyes of the animal during any time in which they may be endangered. The most likely situation is when animals as pets are traveling in automobiles moving at a high rate of speed. As instinct commands, the animal desires to extend his head out an open window and into the onrushing wind. The force and pressure of the wind will damage the eyes of the animal by removing the tears leaving the eyes susceptible to infection and aggravation caused by dust and nonaqueous moisture. The goggles 10 may also be installed on the animal 25 where it is perceived by the animal's handler that the animal in its work or training may suffer physical damage caused by protruding objects. Of course, these examples are not meant to be inclusive, for the application of this invention is incapable of precise limitation.

The shape of the envelope 11 and the two elastic bands 16 and 17 cooperate to position the glasses on the animal's head and the throat engaging strap 17 normally crosses over the other strap to aid in retaining the goggles in position. The device is especially suitable for dogs and particularly for breeds such as poodles, schnauzers, etc.

An enclosure groove 23 is formed in the plastic envelope 11 which extends around the opening in which the window 18 is positioned. The plastic lips forming the groove are deflectible readily to enable the window 18 to be inserted into and seated in the groove.

It should now be readily apparent that a structure has been presented whereby protective animal goggles having a vertical shatterproof plastic window in contoured shielding portions may be installed upon an animal using adjustable elastic strapping bands to prevent damage to the eyes of the animal.

While in accordance with the Patent Statutes only the best mode and preferred embodiment of the invention has been presented and described in detail, it is to be understood that the invention is not limited thereto or thereby. Consequently, for an appreciation of the scope and breadth of the invention, reference should be had to the following claims.

What is claimed is:

1. An eye protection device adaptable to mammalian, non-human animals, comprising:
    a soft, flexible plastic envelope forming a goggle enclosure about the eyes, protecting the eyes of the animal from direct exposure to foreign objects and fumes; said envelope having a front, upper, lower, and two side portions, said upper, lower and said side portions extending rearward to comfortably conform to the angular anterior cranial features of the particular mammalian, non-human animal; said front portion normal to said upper, lower, and side portions of said envelope;
    said side portions having two elastic band means for securing said envelope to the cranium, one said band means extending around the posterior surface of the cranium and the other said band means extending around the mandible of the animal;
    said side portions having venting means for permitting indirect exposure of the animal's eyes to the atmosphere; and
    a shatterproof, plastic window positioned at said front portion of said envelope, said window normal to the line of sight by the eyes of the animal.

2. An eye protection device as in claim 1 where said elastic band means for securing said envelope to the cranium of its wearer is attached to forward lower portions of each said side portion and said other band means is attached to rearward lower portions of each said side portion.

3. An eye protecting device as in claim 1 wherein said envelope is roughly of tubular shape and wherein said upper portion is much longer than lower portions and said side to extend back and engage the animal's cranium above its eyes.

4. An eye protecting device as in claim 3 where said venting means are formed at the rear edges of laterally projecting rib or vanes provided in said side portions of said envelope.

* * * * *